United States Patent Office 3,316,313
Patented Apr. 25, 1967

3,316,313
PREPARATION OF BICYCLOALKYL AND CYCLO-
ALKYLCYCLOALKENE HYDROCARBONS
George R. Lester, Mount Prospect, Ill., assignor to Universal Oil Products Company, Des Plaines, Ill., a corporation of Delaware
No Drawing. Filed Feb. 23, 1965, Ser. No. 434,650
9 Claims. (Cl. 260—666)

This invention relates to the preparation of bicycloalkyl and cycloalkylcycloalkene hydrocarbons. More particularly, it relates to the preparation of bicyclohexyl, useful as a penetrant and high boiling solvent, and cyclohexylcyclohexane.

It is an object of this invention to prepare the aforesaid bicycloalkyl and cycloalkylcycloalkene hydrocarbons from halocycloalkane starting materials by a novel process. For example, in one of its broad aspects, this invention embodies a process which comprises passing a halocycloalkane in contact with a basic metal oxide selected from the group consisting of magnesium oxide, calcium oxide and zinc oxide at a liquid hourly space velocity of from about 1 to about 100 and at a temperature of from about 50° C. to about 200° C., and recovering the bicycloalkyl and cycloalkylcycloalkene reaction products.

One of the more specific embodiments relates to a process which comprises passing a halocyclohexane in contact with magnesium oxide at a liquid hourly space velocity of from about 10 to about 100 at a temperature of from about 50° C. to about 150° C., and recovering the bicyclohexyl and cyclohexylcyclohexene reaction products.

A still more specific embodiment concerns a process which comprises passing bromocyclohexane in contact with magnesium oxide at a liquid hourly space velocity of from about 10 to about 100 and at a temperature of from about 50° C. to about 150° C., and recovering the bicyclohexyl and cyclohexylcyclohexene reaction products.

Other objects and embodiments of this invention will become apparent in the following detailed specification.

The halocycloalkanes employed as starting materials to form the bicycloalkyl and cycloalkylcycloalkene products pursuant to the process of this invention include the various monohalogen derivatives of cyclopropane, cyclobutane, cyclopentane, cyclohexane, cycloheptane, cyclooctane, cyclodecane, cyclododecane, etc., and also the various monohalogen derivatives of the related condensed ring cycloalkanes such as decalin and the like. More specifically, suitable starting materials include chlorocyclopropane, bromocyclopropane, iodocyclopropane, fluorocyclopropane, chlorocyclobutane, bromocyclobutane, iodocyclobutane, fluorocyclobutane, chlorocyclopentane, bromocyclopentane, iodocyclopentane, fluorocyclopentane, chlorocyclohexane, bromocyclohexane, iodocyclohexane, fluorocyclohexane, etc. The bromo and iodo derivatives are preferred in view of the fact that bromine and iodine values are more readily recovered in the manner hereinafter described. The halocycloalkane starting material may contain alkyl substituents, as in the case of 3-methylcyclohexylbromide, to give corresponding reaction products.

The basic metal oxide utilized in conjunction with the process of this invention can be an oxide of magnesium, calcium, zinc, or any combination thereof, magnesium oxide being preferred. In the course of the coupling reaction to give bicycloalkyl and cycloalkylcycloalkene reaction products, hydrogen halide is formed as a by-product. The described basic metal oxides have an unusual capacity for hydrogen halide. It is considered that the basic metal oxide initiates the reaction and, in combination with the hydrogen halide formed in the process, further catalyzes the coupling reaction to form the desired bicycloalkyl and cycloalkylcycloalkene reaction products. The manner in which the hydrogen halide combines with the basic metal oxide is not readily apparent. It may be that the hydrogen halide is adsorbed on the basic metal oxide in physical and/or chemical combination therewith. On the other hand, the hydrogen halide may combine with the basic metal oxide to form the corresponding metal halide. It is contemplated that the nature of the basic metal oxide-hydrogen halide combination is a composite of the above-described forms.

The basic metal oxides herein described are utilized in any desired particulate form including irregularly shaped granules as well as particles of definite size and shape. The latter may be prepared by conventional means, for example, by commingling a powdered form of the basic metal oxide with a suitable pelleting agent such as hydrogenated vegetable oil, graphite, etc., and compressing the same into pellets. In any case, the basic metal oxide is calcined prior to use. Calcination is suitably effected at a temperature of from about 400° C. to about 800° C. in an oxidizing atmosphere such as air, or in an inert atmosphere such as nitrogen.

As has been stated, the basic metal oxides of this invention has an unusual capacity for hydrogen halide such as is formed in the process of this invention. It is an advantage of the present process that the hydrogen halide is retained in combination with the basic metal oxide to permit recovery of the desired reaction products substantially free of said halide. In addition, the basic metal oxide is readily regenerated and halogen values recovered therefrom by oxidative treatment with air or other oxygen-containing gas. In the latter case, it may be desirable to initially incorporate a suitable oxidation catalyst with the basic metal oxide, say from about 0.1 to about 10 wt. percent copper oxide or cerium oxide, to facilitate regeneration and maximize recovery of halogen. Regeneration in this manner is suitably effected at a temperature in the range of from about 225° C. to about 350° C.

Cyclohexene is formed as a by-product of the process of this invention, the amount formed increasing with temperature and contact time. In general, a contact time equivalent to a liquid hourly space velocity of from about 1 to about 100 is operable to produce the desired reaction products at a temperature of from about 50° C. to about 200° C. A reaction temperature of from about 50° C. to about 150° C. is preferred to effect an improved product distribution, particularly at a more limited contact time equivalent to a liquid hourly space velocity of from about 10 to about 100.

Reaction conditions relate principally to temperature and contact time. The process can be effected in the vapor phase although a liquid phase operation is preferable for maximum yield of the desired dimerization product. Although the process can be effected at an elevated pressure, for example, to maintain the liquid phase reaction conditions at elevated temperature, pressure is not considered an important variable with respect to this process.

The process of this invention is effected in a continuous type of operation. For example, the selected basic metal oxide is disposed in a fixed bed of a suitable reactor. A vertical tubular reactor embodying a preheating section is suitable. The halocycloalkane charge is preheated to the desired temperature and passed downwardly in contact with the said basic metal oxide. The reactor effluent is cooled and distilled, the overhead being vented to the atmosphere through a caustic scrubber to remove any enained halogen. Unreacted halocycloalkane is separated and recycled to the reactor as a portion of the charge thereto while the reaction product comprising bicyclokyl, cycloalkylcycloalkene and cycloalkene is separated to its component parts by fractionation or other suitable separation means. Before the capacity of the basic metal oxide for hydrogen halide has been reached or exceeded, the halocycloalkane flow is halted and a stream of air is directed over the spent or partially spent basic metal oxide at conditions effecting the oxidation of hydrogen halide and regeneration of the basic metal oxide. The halocycloalkane charge is alternated with the flow of air to effect continuous type of process.

The following examples are presented in illustration of the process of this invention and are not intended as an undue limitation on the generally broad scope of the invention as set out in the appended claims.

EXAMPLE I

In this example, bromocyclohexane is charged to a vertical tubular glass reactor, passing downflow through a preheat section containing 50 cc. of porcelain rings and then in contact with 50 cc. of granular magnesium oxide (26.1 grams, 4–20 mesh) disposed in a fixed bed, passing in contact with said magnesium oxide at a liquid hourly space velocity of about 1. The bromocyclohexane is preheated and passed in contact with the magnesium oxide at a temperature of 150° C. In this once-through operation about a 95% conversion of the bromocyclohexane is attained. The reaction product comprises approximately 1.3% bicyclohexyl and 1.5% cyclohexylcyclohexene, the bulk of the product consisting of cyclohexene (92%).

EXAMPLE II

In this example, bromocyclohexane is charged to the said reactor, preheated, and passed in contact with 50 cc. of magnesium oxide (25.9 grams, 4–20 mesh) located in a fixed bed at a liquid hourly space velocity of about 10 and at a temperature of about 50° C. In this once-through operation about a 35% conversion of bromocyclohexane is attained. The reaction product comprises about 86% bicyclohexyl, 4% cyclohexylcyclohexene and about 6% cyclohexene.

EXAMPLE III

In this example, bromocyclohexane is charged to the aforesaid reactor, preheated, and passed in contact with the magnesium oxide (50 cc., 25.8 grams) at a liquid hourly space velocity of about 10 and at a temperature of about 150° C. Approximately a 60% conversion of bromocyclohexane is effected in this once-through operation. The reaction product comprises about 27% bicyclohexyl, 8% cyclohexylcyclohexene and about 60% cyclohexene.

EXAMPLE IV

A bromocyclohexane conversion of about 40% is effected on passing bromocyclohexane in contact with 26.0 grams of magnesium oxide at a temperature of about 150° C. at a liquid hourly space velocity of about 100, the bromocyclohexane being charged downflow through a preheater and then in contact with the magnesium oxide (50 cc.) as aforesaid. The reaction product recovered from the reactor effluent comprises about 61% bicyclohexyl, 12% cyclohexylcyclohexene and about 23% cyclohexene.

EXAMPLE V

Chlorocyclohexane, preheated and passed in contact with 50 cc. of granular calcium oxide (35.2 grams) at a temperature of about 100° C. and at a liquid hourly space velocity of about 10, is converted to bicyclohexyl, cyclohexylcyclohexene and cyclohexene in about 55% yield per pass. The chlorocyclohexene is charged downflow in contact with the magnesium oxide in a fixed bed. The reaction product recovered from the reactor effluent comprises about 70% bicyclohexyl, 8% cyclohexylcyclohexene and about 17% cyclohexene.

EXAMPLE VI

In this example, about 50 cc. of granular zinc oxide (43.2 grams) is disposed in a fixed bed within a vertical tubular reactor. Chlorocyclohexane is preheated and passed downflow in contact with the zinc oxide at a liquid hourly space velocity of about 10 and at a temperature of about 100° C. About a 47% conversion of chlorocyclohexane is effected on a once-through basis. The reaction product comprises about 72% bicyclohexyl, 10% cyclohexylcyclohexene and 13% cyclohexene.

EXAMPLE VII

Iodocyclohexane, preheated and passed in contact with 50 cc. of granular magnesium oxide (26.0 grams) at a temperature of about 150° C. and at a liquid hourly space velocity of about 10, is converted to bicyclohexyl, cyclohexylcyclohexene and cyclohexene in about a 35% yield per pass. The iodocyclohexane is charge downflow. The reaction product recovered from the reactor effluent comprises about 33% bicyclohexyl, 6% cyclohexylcyclohexene and 53% cyclohexene.

I claim is my invention:

1. A process which comprises passing a halocyclohexane in contact with a basic metal oxide selected from the group consisting of magnesium oxide, calcium oxide and zinc oxide at a liquid hourly space velocity of from about 10 to about 100 and at a temperature of from about 50° C. to about 150° C., and recovering the bicyclohexyl and cyclohexylcyclohexene reaction products.

2. A process which comprises passing a halocyclohexane in contact with magnesium oxide at a liquid hourly space velocity of from about 10 to about 100 and at a temperature of from about 50° C. to about 150° C., and recovering the bicyclohexyl and cyclohexylcyclohexene reaction products.

3. A process which comprises passing a halocyclohexane in contact with calcium oxide at a liquid hourly space velocity of from about 10 to about 100 and at a temperature of from about 50° C. to about 150° C., and recovering the bicyclohexyl and cyclohexylcyclohexene reaction products.

4. A process which comprises passing a halocyclohexane in contact with zinc oxide at a liquid hourly space velocity of from about 10 to about 100 and at a temperature of from about 50° C. to about 150° C., and recovering the bicyclohexyl and cyclohexylcyclohexene reaction products.

5. A process which comprises passing bromocyclohexane in contact with magnesium oxide at a liquid hourly space velocity of from about 10 to about 100 and at a temperature of from about 50° C. to about 150° C., and recovering the bicyclohexyl and cyclohexylcyclohexene reaction products.

6. A process which comprises passing iodocyclohexane in contact with magnesium oxide at a liquid hourly space velocity of from about 10 to about 100 and at a temperature of from about 50° C. to about 150° C., and recovering the bicyclohexyl and cyclohexylcyclohexene reaction products.

7. A process which comprises passing chlorocyclohexane in contact with zinc oxide at a liquid hourly space velocity of from about 10 to about 100 and at a temperature of from about 50° C. to about 150° C., and recovering the bicyclohexyl and cyclohexylcyclohexene reaction products.

8. A process which comprises passing fluorocyclohexane in contact with magnesium oxide at a liquid hourly space velocity of from about 10 to about 100 and at a temperature of from about 50° C. to about 150° C., and recovering the bicyclohexyl and cyclohexylcyclohexene reaction products.

9. A process which comprises passing chlorocyclohexane in contact with calcium oxide at a liquid hourly space velocity of from about 10 to about 100 and at a temperature of from about 50° C. to about 150° C., and recovering the bicyclohexyl and cyclohexylcyclohexene reaction products.

References Cited by the Examiner

UNITED STATES PATENTS

| | | | |
|---|---|---|---|
| 2,490,973 | 12/1949 | Leonard | 260—666 |
| 3,025,329 | 3/1962 | Gleason | 260—666 |
| 3,246,043 | 4/1966 | De Rosset et al. | 260—666 |

DELBERT E. GANTZ, *Primary Examiner.*

V. O'KEEFE, *Assistant Examiner.*